United States Patent
Yu

(10) Patent No.: US 12,064,950 B2
(45) Date of Patent: Aug. 20, 2024

(54) LAMINATING STRUCTURE OF OPTICAL CLEAR BINDER OF OPTICAL PANEL

(71) Applicant: Acute Touch Technology Co., Ltd., Taoyuan (TW)

(72) Inventor: Gu-Sheng Yu, Taoyuan (TW)

(73) Assignee: ACUTE TOUCH TECHNOLOGY CO., LTD., Taoyuan (TW)

(*) Notice: Subject to any disclaimer, the term of this patent is extended or adjusted under 35 U.S.C. 154(b) by 636 days.

(21) Appl. No.: 17/195,051

(22) Filed: Mar. 8, 2021

(65) Prior Publication Data
US 2021/0291489 A1 Sep. 23, 2021

(30) Foreign Application Priority Data
Mar. 17, 2020 (TW) ................... 109108837

(51) Int. Cl.
*B32B 7/12* (2006.01)
*B32B 7/06* (2019.01)
(Continued)

(52) U.S. Cl.
CPC ................ *B32B 7/12* (2013.01); *B32B 7/06* (2013.01); *B32B 9/005* (2013.01); *B32B 9/04* (2013.01);
(Continued)

(58) Field of Classification Search
CPC .. B32B 7/12; B32B 7/06; B32B 9/005; B32B 9/04; B32B 9/045; B32B 17/06;
(Continued)

(56) References Cited

U.S. PATENT DOCUMENTS 9,295,297 B2 * 3/2016 Wilson .................... B32B 7/023
2010/0110354 A1 * 5/2010 Suzuki .............. G02F 1/133308
349/122
(Continued)

FOREIGN PATENT DOCUMENTS

| CN | 204155237 U | 2/2015 |
| CN | 105733476 A | 7/2016 |
| TW | 200904933 A | 2/2009 |

OTHER PUBLICATIONS

Office Action dated Oct. 28, 2020 of the corresponding Taiwan patent application No. 109108837.
(Continued)

*Primary Examiner* — Scott R. Walshon
(74) *Attorney, Agent, or Firm* — Chun-Ming Shih; HDLS IPR SERVICES

(57) ABSTRACT

A laminating structure of an optical clear binder (OCB) of an optical panel is applied between a display protective cover lens and a display module, or between a touch panel and the display module. The laminating structure includes two transparent low-adhesion adhesive layers and a first optical transparent sheet. One of the transparent low-adhesion adhesive layers is repeatedly removeable and directly attached to the protective cover lens or the touch panel, the other one of the transparent low-adhesion adhesive layers is repeatedly removeable and directly attached to the display module. The first optical transparent sheet is stacked between both the transparent low-adhesion adhesive layers. An upper surface of the first optical transparent sheet and a lower surface of the first optical transparent sheet are directly attached to an optical clear adhesive (OCA) layer.

5 Claims, 5 Drawing Sheets

(51) Int. Cl.
    *B32B 9/00*         (2006.01)
    *B32B 9/04*         (2006.01)
    *B32B 17/06*       (2006.01)
    *B32B 17/10*       (2006.01)
    *B32B 27/08*       (2006.01)
    *C09J 131/04*     (2006.01)
    *C09J 133/08*     (2006.01)
    *C09J 163/00*     (2006.01)
    *C09J 175/04*     (2006.01)
    *C09J 183/04*     (2006.01)

(52) U.S. Cl.
    CPC .............. *B32B 9/045* (2013.01); *B32B 17/06* (2013.01); *B32B 17/10* (2013.01); *B32B 27/08* (2013.01); *C09J 131/04* (2013.01); *C09J 133/08* (2013.01); *C09J 163/00* (2013.01); *C09J 175/04* (2013.01); *C09J 183/04* (2013.01); *B32B 2307/412* (2013.01); *B32B 2457/202* (2013.01); *B32B 2457/208* (2013.01)

(58) Field of Classification Search
    CPC ... B32B 17/10; B32B 27/08; B32B 2307/412; B32B 2457/202; B32B 2457/208; C09J 131/04; C09J 133/08; C09J 163/00; C09J 175/04; C09J 183/04
See application file for complete search history.

(56) References Cited

U.S. PATENT DOCUMENTS

2015/0359675 A1\* 12/2015 Wilson .................. B32B 27/365
                                                                                           2/431
2016/0185083 A1\*  6/2016 Yasui ...................... B32B 27/08
                                                                                         428/1.55
2018/0155576 A1\*  6/2018 Ahn ........................ H05K 5/0017
2020/0139671 A1\*  5/2020 Cao .......................... B32B 17/06

OTHER PUBLICATIONS

Office Action dated Nov. 1, 2023 of the corresponding China patent application No. 202110249701.9.

\* cited by examiner

LAMINATING STRUCTURE OF OPTICAL CLEAR BINDER OF OPTICAL PANEL

BACKGROUND

Technical Field

The present disclosure relates to a laminating structure of an optical clear binder (OCB), and more particular to a laminating structure of the OCB of an optical panel, which is applied between a display module and a display protective cover lens or a touch panel.

Description of Related Art

The statements in this section merely provide background information related to the present disclosure and do not necessarily constitute prior art.

Along with the development of microelectronics technology and rapid popularization of smart 3C products, no matter a large outdoor public display, a home TV, a car screen, a game console, a smartphone, or a wearable device, they are adopted display modules with more functionality and better performance. In particular, enhancing resolution, shortening response time, widening viewing angle, miniaturization, thinning and even curved surface, etc., major manufacturers strive to make breakthroughs in lamination or optical coupling technology of display panel for the best display effect on screen. Traditional edge lamination technology with air gap uses less adhesive, the air gap will not only affect touch sensitivity, but also seriously affect optical performance, such as Newton ring, reflection lost, and ambience reflection light interference, etc. Therefore, the current full lamination (or so call optical bond) technology can significantly reduce light reflection, light loss and chromatic dispersion, in return, improve display brightness, resolution, contrast ratio, clarity and color rendering effect. The laminating strength of full lamination is also higher than traditional edge lamination technology, and the air gap variation to touch signal can be also reduced, thereby improving accuracy of touch performance. Generally, in process of fully laminating with a protective cover lens (CL) or a touch panel (TP) on a display module, such as liquid crystal display module (LCM), Organic Light-Emitting Diode (OLED), etc., there may be air bubbles, small dust particles from process environment, or partial delamination due to process tolerances, that creates lamination defects, process personnel can determine whether rework is required based on experience or actual requirement conditions. Conventional full lamination is often used optical clear adhesive (OCA), optical clear resin (OCR), or thermoplastic optical clear film (OCF) in between CL, TP and LCM, these adhesives include acrylic types adhesive with strong adhesion and low cost, which can be cured by applying pressure, ultraviolet (UV), or heat.

However, besides turning yellow issue, the adhesion of acrylic adhesive is too strong to cause difficulties to rework for thinner displays. And the use of isopropyl alcohol (IPA) solvent in chemical rework method or plastic blade in physical rework method to remove residual glue may increase probability of failure and defects, and may reduce overall production yield and impact to the production cost.

Therefore, how to design a laminating structure with an optical clear binder (OCB) for an optical panel, in particular to solve technical problems of difficult to rework, difficult to remove residual glue, and difficult to improve overall production yield, was studied by inventor of the present disclosure.

SUMMARY

One of purposes of the present disclosure is to provide a laminating structure of an optical clear binder (OCB) of an optical panel, which does not require expensive laminating equipment, which can improve laminating yield, and can reduce the laminating cost. In addition, the present disclosure can solve technical problems of difficult to rework, difficult to remove residual glue, and difficult to improve overall production yield, so as to achieve the purpose of popularizing full lamination technology as a common combination of a display with a display protective cover lens or a touch panel.

In order to achieve the purpose, the laminating structure of an OCB of an optical panel, which is applied between a display module and a protective cover lens or a touch panel, the laminating structure includes a first transparent low-adhesion adhesive layer, a second transparent low-adhesion adhesive layer, and a first optical transparent sheet. The first transparent low-adhesion adhesive layer is repeatedly removeable and directly attached to the protective cover lens or the touch panel. The second transparent low-adhesion adhesive layer is repeatedly removeable and directly attached to the display module. The first optical transparent sheet is stacked between the first transparent low-adhesion adhesive layer and the second transparent low-adhesion adhesive layer, an upper surface of the first optical transparent sheet and a lower surface of the first optical transparent sheet are directly attached to an optical clear adhesive (OCA) layer, and there is no air gap between both the OCA layers and the first transparent low-adhesion adhesive layer and the second transparent low-adhesion adhesive layer. Also, a full lamination between the first transparent low-adhesion adhesive layer and the protective cover lens or the touch panel without air gap, and a full lamination between the second transparent low-adhesion adhesive layer and the display module without air gap.

Further, a second optical transparent sheet is interposed between one of the OCA layers and the first transparent low-adhesion adhesive layer, and a third optical transparent sheet is interposed between the other one of the OCA layers and the second transparent low-adhesion adhesive layer.

Further, materials of the first optical transparent sheet, the second optical transparent sheet and the third optical transparent sheet include an organic plastic transparent sheet, an inorganic transparent sheet, an organic-inorganic composite sheet, or multilayer stacked hybrid sheets.

Further, the first transparent low-adhesion adhesive layer is replaced by the OCA layer on the first optical transparent sheet, and the second transparent low-adhesion adhesive layer is replaced by the OCA layer under the first optical transparent sheet.

Further, materials of the first transparent low-adhesion adhesive layer, and the second transparent low-adhesion adhesive layer includes silicone resin, polyurethane (PU) adhesive, acrylic adhesive, ethylene vinyl acetate, copolymer resin, epoxy plastic ester polymer, or a combination thereof.

Further, materials of the organic plastic transparent sheet include polyethylene terephthalate, cycloolefin polymer, polymethyl methacrylate, polycarbonate, polyimide, polyethylene naphthalate, tri-cellulose acetate, or a combination thereof.

Further, materials of the inorganic transparent sheet include silica glass material, alumina ceramic material, aluminosilicate material, or a combination thereof.

Another one of purposes of the present disclosure is to provide a laminating structure of the OCB of an optical panel, which can solve technical problems of difficult to rework, difficult to remove residual glue, and difficult to improve overall production yield, and can solve yellowing problem of display panel, so as to achieve the purpose of improve overall production yield and the reliability of final products.

In order to achieve the purpose, the laminating structure of the OCB of an optical panel, which is applied between a protective cover lens and a display module, or between a touch panel and the display module, the laminating structure including: a first transparent low-adhesion adhesive layer, a second transparent low-adhesion adhesive layer, and an optical transparent sheet. The first transparent low-adhesion adhesive layer, which is repeatedly removeable and directly attached to the protective cover lens or the touch panel. The second transparent low-adhesion adhesive layer, which is repeatedly removeable and directly attached to the display module. The optical transparent sheet is stacked between the first transparent low-adhesion adhesive layer and the second transparent low-adhesion adhesive layer, and there is no air gap between the optical transparent sheet and the first transparent low-adhesion adhesive layer, and between the optical transparent sheet and the second transparent low-adhesion adhesive layer. There are applied in a full lamination manner between the first transparent low-adhesion adhesive layer and the protective cover lens, between the first transparent low-adhesion adhesive layer and the touch panel, and between the second transparent low-adhesion adhesive layer and the display module.

Further, the first transparent low-adhesion adhesive layer is replaced by the OCA layer on the optical transparent sheet, the second transparent low-adhesion adhesive layer is replaced by the OCA layer under the optical transparent sheet.

Further, materials of the optical transparent sheet include an organic plastic transparent sheet, an inorganic transparent sheet, an organic-inorganic composite sheet, or multilayer stacked hybrid sheets.

Further, materials of the first transparent low-adhesion adhesive layer, and the second transparent low-adhesion adhesive layer include silicone resin, polyurethane (PU) adhesive, acrylic adhesive, ethylene vinyl acetate, copolymer resin, epoxy plastic ester polymer, or a combination thereof.

Further, materials of the organic plastic transparent sheet include polyethylene terephthalate, cycloolefin polymer, polymethyl methacrylate, polycarbonate, polyimide, polyethylene naphthalate, tri-cellulose acetate, or a combination thereof.

Further, materials of the inorganic transparent sheet include silica glass material, alumina ceramic material, aluminosilicate material, or a combination thereof.

More another one of purposes of the present disclosure is to provide a laminating structure of the OCB of an optical panel, which does not require expensive laminating equipment, which can improve laminating yield, and can reduce the laminating cost. In addition, the present disclosure can solve technical problems of difficult to rework, difficult to remove residual glue, and difficult to improve overall production yield, so as to achieve the purpose of popularizing full lamination technology as a common combination of a display with a protective cover lens or a combination of the display and a touch panel.

In order to achieve the purpose, the laminating structure of the OCB of an optical panel, which is applied between a protective cover lens and a display module, or between a touch panel and the display module, the laminating structure includes a transparent low-adhesion adhesive layer, and an OCA layer. The OCA layer is attached to the transparent low-adhesion adhesive layer, and there no air gap between the OCA layer and the transparent low-adhesion adhesive layer. There are applied in a full lamination manner without air gap between the laminating structure and the protective cover lens or the touch panel, and between the laminating structure and the display module.

Further, materials of the transparent low-adhesion adhesive layer include silicone resin, polyurethane (PU) adhesive, acrylic adhesive, ethylene vinyl acetate, copolymer resin, epoxy plastic ester polymer, or a combination thereof.

When using the laminating structure of the OCB of an optical panel of the present disclosure, the first transparent low-adhesion adhesive layer is directly attached to the protective cover lens or the touch panel, the second transparent low-adhesion adhesive layer is directly attached to the display module. The first transparent low-adhesion adhesive layer and the second transparent low-adhesion adhesive layer are both transparent low-adhesion glues. Compared with acrylic adhesives, the low-adhesion glue has lower adhesive force, less residual glue, and better ability to eliminate bubbles. There is no need to use isopropyl alcohol (IPA) solvent or plastic blade to remove the residual glue, and the low-adhesion glue has better resistance to temperature and humidity, and the low-adhesion glue is no easy to turn yellow.

Further, the laminating structure can be used with different optical transparent sheets to have different purpose. For example: tri-cellulose acetate can be used as base material of polarizers, and polyethylene terephthalate can be used as base material of anti-reflection coating (ARC) film or anti-glare film, etc. For this reason, the present disclosure does not require the use of expensive luminating equipment, and can improve luminating yield and reduce luminating cost. The present disclosure solves technical problems of difficult to rework, difficult to remove residual glue, and difficult to improve overall production yield, so as to achieve the purpose of popularizing full lamination technology as a common combination of a display with a protective cover lens or a combination of the display with a touch panel.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

Figure 1:
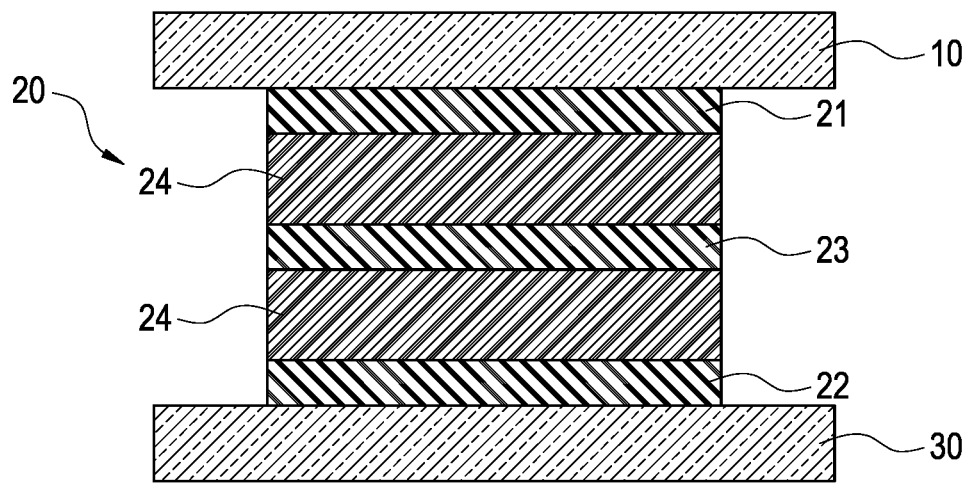
FIGS. 1, 1a, and 1b are schematic structural diagrams of the first embodiment of a laminating structure of an optical clear binder (OCB) of an optical panel of the present disclosure.

The embodiments of the present disclosure are described by way of specific examples, and those skilled in the art can readily appreciate the other advantages and functions of the present disclosure. The present disclosure may be embodied or applied in various other specific embodiments, and various modifications and changes can be made without departing from the spirit and scope of the present disclosure.

It should be understood that the structures, the proportions, the sizes, the number of components, and the like in the drawings are only used to cope with the contents disclosed in the specification for understanding and reading by those skilled in the art, and it is not intended to limit the conditions that can be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure.

The technical content and detailed description of the present disclosure will be described below in conjunction with the drawings.

Figure 1A:
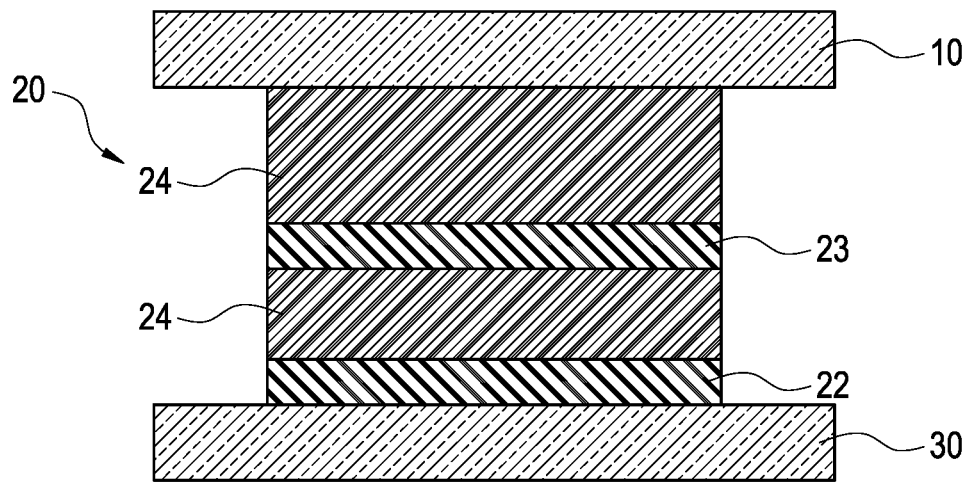
Figure 1B:
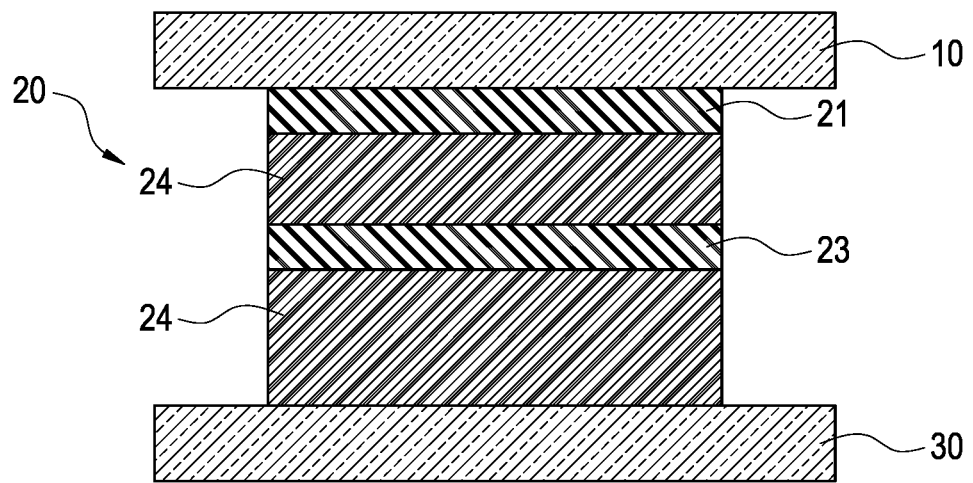
Figure 2:
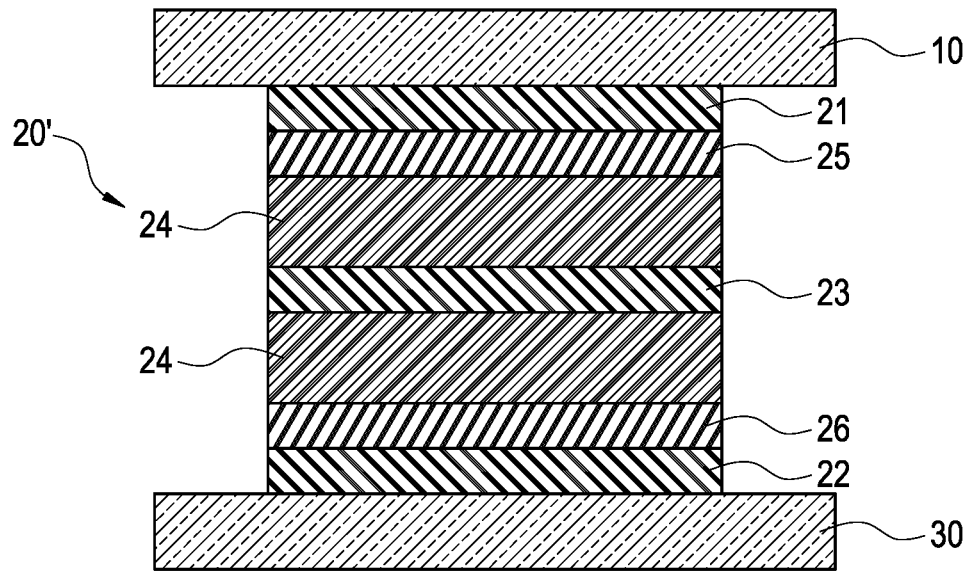
FIGS. 2, 2a, and 2b are schematic structural diagrams of the second embodiment of the laminating structure of the OCB of the optical panel of the present disclosure.
Figure 2A:
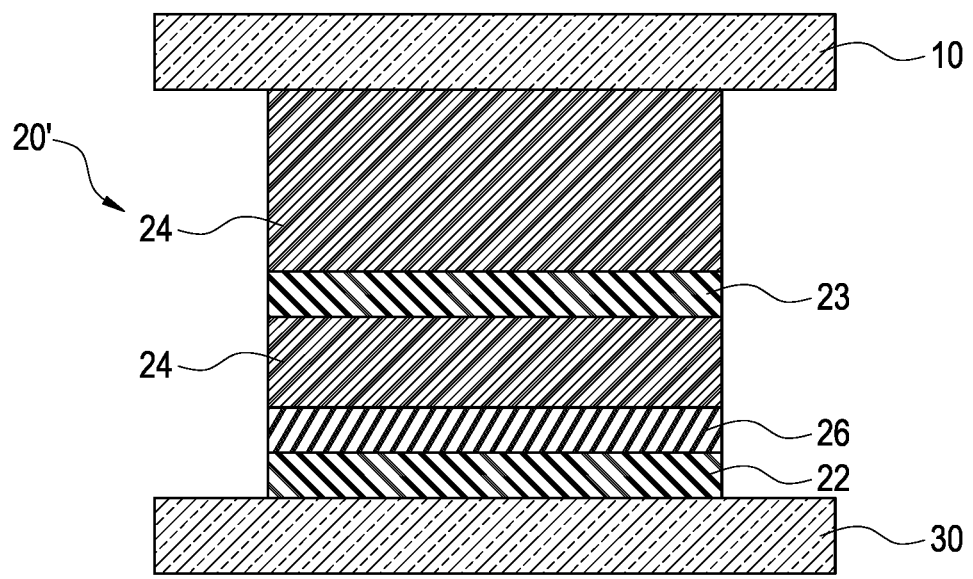
Figure 2B:
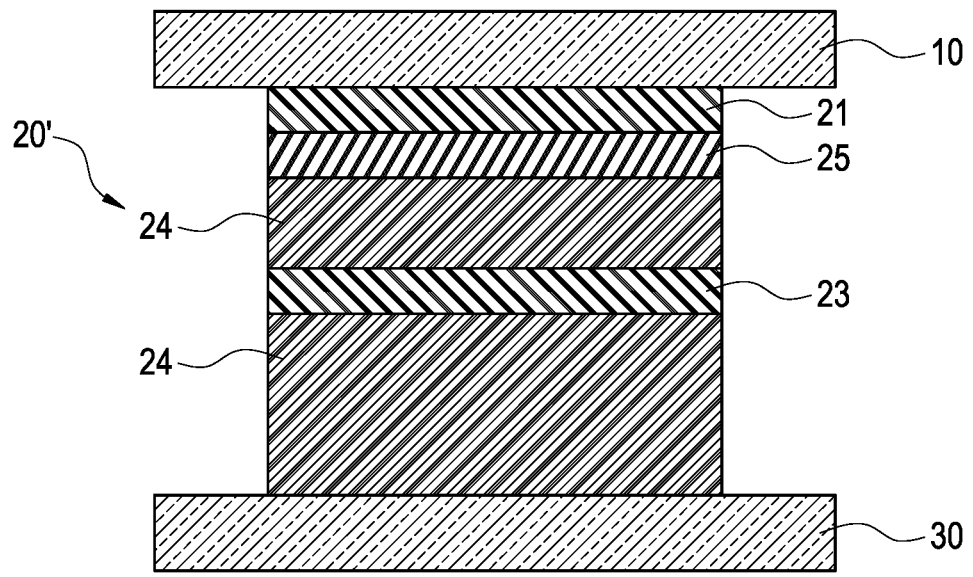

Please refer to FIG. 1 to FIG. 2b. FIGS. 1, 1a, and 1b are schematic structural diagrams of a first embodiment of a laminating structure of an optical clear binder (OCB) of an optical panel of the present disclosure. FIGS. 2, 2a, and 2b are schematic structural diagrams of a second embodiment of the laminating structure of the OCB of the optical panel of the present disclosure.

As shown in FIG. 1, in the first embodiment of the present disclosure, a laminating structure 20 of the OCB of the optical panel is applied between a protective cover lens 10 and a display module (such as a liquid crystal display module (LCM) 30), or between a touch panel (TP) 10 and the LCM 30. The laminating structure 20 includes a first transparent low-adhesion adhesive layer 21, a second transparent low-adhesion adhesive layer 22, and a first optical transparent sheet 23. The first transparent low-adhesion adhesive layer 21 is repeatedly removeable and directly attached to the protective cover lens 10 or the TP 10. The second transparent low-adhesion adhesive layer 22 is repeatedly removeable and directly attached to the LCM 30. In the first embodiment of the present disclosure, a full lamination manner without air gap is applied between the first transparent low-adhesion adhesive layer 21 and the protective cover lens 10, or between the first transparent low-adhesion adhesive layer 21 and the TP 10, and between the second transparent low-adhesion adhesive layer 22 and the LCM 30. The first transparent low-adhesion adhesive layer 21 or the second transparent low-adhesion adhesive layer 22 may include a pure low-adhesion adhesive, such as silicone resin, or a mixed low-adhesion adhesive doped with polyurethane (PU) or acrylic.

The first optical transparent sheet 23 is stacked between the first transparent low-adhesion adhesive layer 21 and the second transparent low-adhesion adhesive layer 22. An upper surface of the first optical transparent sheet 23 and a lower surface of the first optical transparent sheet 23 are directly attached to an optical clear adhesive (OCA) layer 24. There is no air gap between both the OCA layers 24 and the first transparent low-adhesion adhesive layer 21, and between both the OCA layers 24 and the second transparent low-adhesion adhesive layer 22. Materials of the first transparent low-adhesion adhesive layer 21, the second transparent low-adhesion adhesive layer 22, and the OCA layer 24 include silicone resin, polyurethane (PU) adhesive, acrylic adhesive, ethylene vinyl acetate, copolymer resin, epoxy plastic ester polymer, or a combination thereof.

Further, the first optical transparent sheet 23 of the present disclosure can be adjusted according to a function of the laminating structure 20. Materials of the first optical transparent sheet 23 include an organic plastic transparent sheet, an inorganic transparent sheet, an organic-inorganic composite sheet, or multilayer stacked hybrid sheets. For example, tri-cellulose acetate (TCA) may be used as base material of polarizer (POL), or use commercial polarizer as optical transparent sheets, polyethylene terephthalate (PET) or its multilayer stack combination, cycloolefin polymer (COP) or its multilayer stack combination, polyethylene naphthalate (PEN) or its multilayer stack combination, acrylic, polycarbonate, transparent glass or ceramic material, or its composite materials and so on.

Please refer to FIGS. 1a and 1b for other two structural aspects of the first embodiment of the present disclosed. As shown in FIG. 1a, the structure is substantially the same as that in FIG. 1, except that the first transparent low-adhesion adhesive layer 21 is replaced by the OCA layer 24 on the first optical transparent sheet 23. As shown in FIG. 1b, the structure is substantially the same as that in FIG. 1, except that the second transparent low-adhesion adhesive layer 22 is replaced by the OCA layer 24 under the first optical transparent sheet 23.

As shown in FIG. 2, it is a schematic structural diagram of a second embodiment of the laminating structure of the OCB of the optical panel of the present disclosure. The second embodiment of the present disclosure is substantially the same as the first embodiment, except that the laminating structure 20' of the OCB of the second embodiment further includes a second optical transparent sheet 25 and a third optical transparent sheet 26. Materials of the first optical transparent sheet 23, the second optical transparent sheet 25 and the third optical transparent sheet 26 include an organic plastic transparent sheet, an inorganic transparent sheet, an organic-inorganic composite sheet, or multilayer stacked hybrid sheets. Materials of the organic plastic transparent sheet include polyethylene terephthalate (PET), cycloolefin polymer (COP), polymethyl methacrylate (PMMA), polycarbonate, polyimide, polyethylene naphthalate, tri-cellulose acetate (TCA), or a combination thereof. Materials of the inorganic transparent sheet include silica glass material, alumina ceramic material, aluminosilicate material, or a combination thereof.

The second optical transparent sheet 25 can be interposed between one of the OCA layers 24 and the first transparent low-adhesion adhesive layer 21. The third optical transparent sheet 26 can be interposed between the other one of the OCA layers 24 and the second transparent low-adhesion adhesive layer 22.

Please refer to FIG. 2a and FIG. 2b, which are two other structural aspects of the second embodiment of the present disclosure. As shown in FIG. 2a, the structure is substantially the same as that in FIG. 2, except that the first transparent low-adhesion adhesive layer 21 and the second optical transparent sheet 25 are replaced by the OCA layer 24 on the first optical transparent sheet 23. As shown in FIG.

2b, the structure is substantially the same as that in FIG. 2, except that the second transparent low-adhesion adhesive layer 22 and the third optical transparent sheet 26 are replaced by the OCA layer 24 under the first optical transparent sheet 23.

Figure 3:
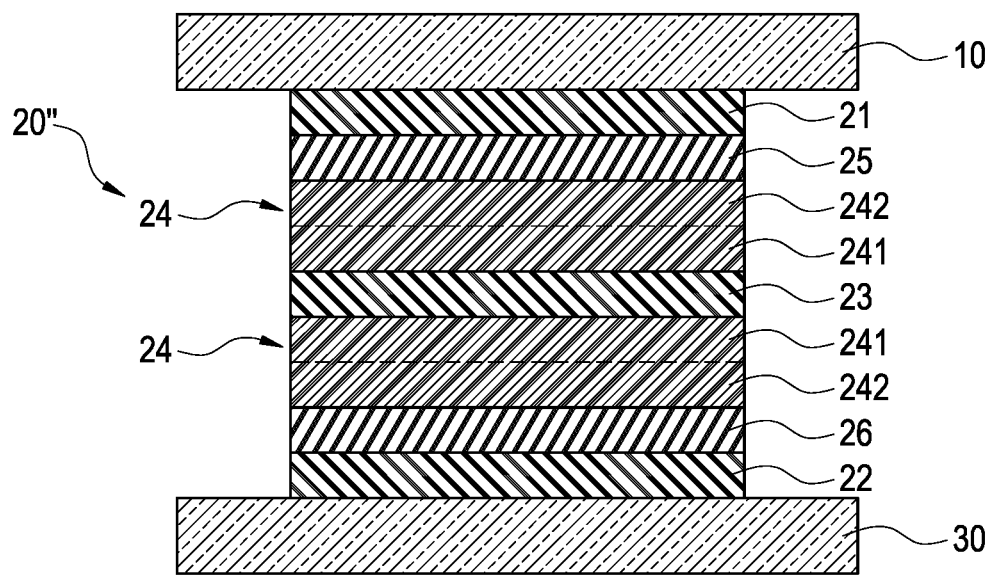
FIG. 3 is a schematic structural diagram of the third embodiment the laminating structure of the OCB of the optical panel of the present disclosure.

As shown in FIG. 3, it is a schematic structural diagram of a third embodiment of the laminating structure of the OCB of the optical panel of the present disclosure. The third embodiment of the present disclosure is substantially the same as the second embodiment, except that the laminating structure 20' of the OCB of the third embodiment has different OCA layers 24 different from the laminating structure 20" of the OCB of the second embodiment. The OCA layers 24 of the third embodiment of the present disclosure includes a first structure 241 and a second structure 242 stacked on each other. The first structure 241 and the second structure 242 may have the same composition ratio and different thicknesses, may have different composition ratios but the same thickness, or may have different treatments (such as heat treatment), etc. However, the present disclosure is not limited thereto.

Figure 4:
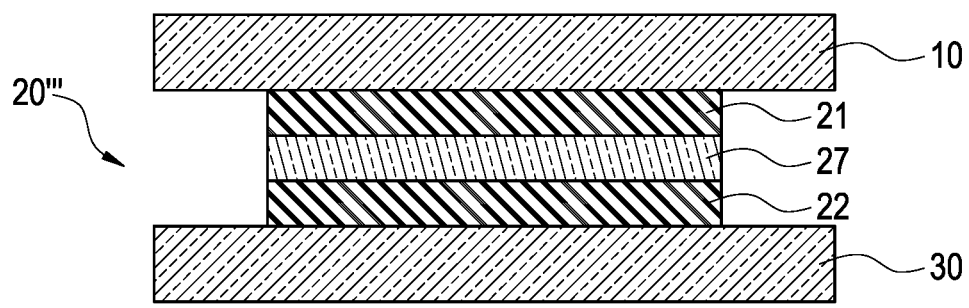
FIG. 4 is a schematic structural diagram of the fourth embodiment of the laminating structure of the OCB of the optical panel of the present disclosure.

As shown in FIG. 4, it is a schematic structural diagram of a fourth embodiment of the laminating structure of the OCB of the optical panel of the present disclosure. The fourth embodiment of the present disclosure is substantially the same as the first embodiment, except that the laminating structure 20''' of the OCB of the third embodiment does not include the OCA layer 24 compared with the first embodiment. In another embodiment not shown in figures, the optical transparent sheet 27 can also be replaced by the first optical transparent sheet 23.

Figure 5A:
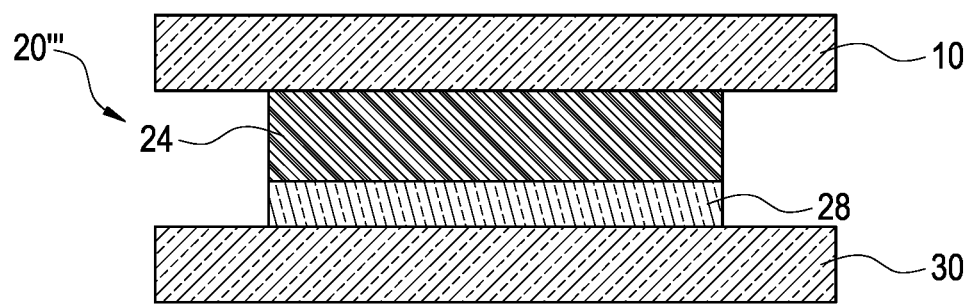
FIGS. 5A and 5B are schematic structural diagrams of the fifth embodiment of the laminating structure of the OCB of the optical panel of the present disclosure.
Figure 5B:
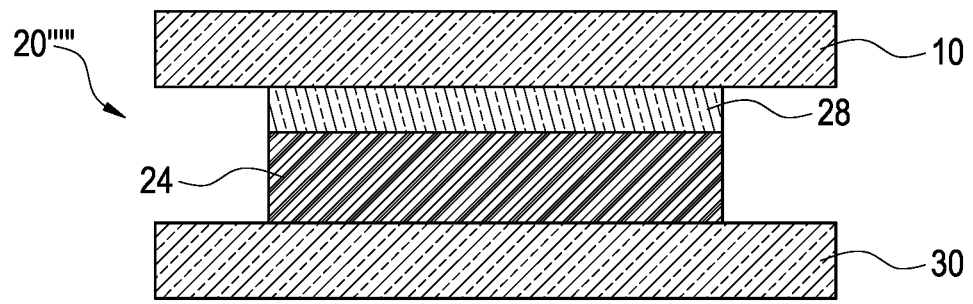

FIGS. 5A and 5B are schematic structural diagrams of a fifth embodiment of the laminating structure of the OCB of the optical panel of the present disclosure. The laminating structure 20''' of the OCB (as shown in FIG. 5A) and the laminating structure 20'''' of the OCB (as shown in FIG. 5B) of the fifth embodiment of the present disclosure only include a transparent low-adhesion adhesive layer 28 and the OCA layer 24. A full lamination manner without air gap is applied between the laminating structure 20''', 20'''' (which may be the side of the transparent low-adhesion adhesive layer 28 or the side of the OCA layer 24) and the protective cover lens 10 or the TP 10, and the laminating structure 20''', 20'''' (It may be the side of the transparent low-adhesion adhesive layer 28 or the side of the optical clear adhesive layer 24) and the LCM 30.

Using the laminating structure 20-20'''' of the OCB of the optical panel of the present disclosure may include the following steps: the first transparent low-adhesion adhesive layer 21 is repeatedly removeable and directly attached to the protective cover lens 10 or the TP 10 in a full lamination manner. The second transparent low-adhesion adhesive layer 22 is repeatedly removeable and directly attached to the LCM 30 in a full lamination manner. Before a pressure defoaming process or a curing process is performed on the optical panel, the protective cover lens 10 or the TP 10 or the LCM 30 may be reworked. The curing procedure may include pressure curing, ultraviolet (UV) curing, thermal curing, or room temperature curing.

When the protective cover lens 10 or the TP 10 needs to be reworked, after the protective cover lens 10 or the TP 10 is separated from the first transparent low-adhesion adhesive layer 21, the first transparent low-adhesion adhesive layer 21 is directly attached to the protective cover lens 10 or the TP 10 in a full lamination manner. When the LCM 30 needs to be reworked, after the LCM 30 is separated from the second transparent low-adhesion adhesive layer 22, the second transparent low-adhesion adhesive layer 22 is directly applied to the LCM 30 in a full lamination manner.

Since the first transparent low-adhesion adhesive layer 21 is directly attached to the protective cover lens 10 or the TP 10, the second transparent low-adhesion adhesive layer 22 is directly attached to the LCM 30. The first transparent low-adhesion adhesive layer 21 and the second transparent low-adhesion adhesive layer 22 are both transparent low-adhesion glues. Compared with acrylic adhesives, the low-adhesion glue has lower adhesion force, less residual glue, and better ability to eliminate bubbles. There is no need to use isopropyl alcohol (IPA) solvent or plastic blade to remove the residual glue, and the low-adhesion glue has better resistance to temperature and humidity, and the low-adhesion glue is no easy to turning yellow. The present disclosure has good re-workability or maintainability.

Further, the laminating structure 20-20'''' can be used with different optical transparent sheets to have different purposes. For example, tri-cellulose acetate (TCA) can be used as base material of polarizer (POL), or use commercial polarizer as optical transparent sheets, polyethylene terephthalate (PET) or its multilayer stack combination, cycloolefin polymer (COP) or its multilayer stack combination, polyethylene naphthalate (PEN) or its multilayer stack combination, acrylic, polycarbonate, transparent glass or ceramic material, or its composite materials and so on. For this reason, the present disclosure does not require the use of expensive luminating equipment, and can improve luminating yield and reduce luminating cost. The present disclosure solves technical problems of difficult to rework, difficult to remove residual glue, and difficult to improve overall production yield, so as to achieve the purpose of popularizing full lamination technology as a common combination of a display with a protective cover lens or a combination of the display and a touch panel.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that can be easily conceived by those skilled in the art in the field of the present disclosure can be covered by the following claims.

What is claimed is:

1. A laminating structure of an optical clear binder (OCB) of an optical panel applied between a display protective cover lens and a display module, or between a touch panel and the display module, the laminating structure comprising:
   a first transparent low-adhesion adhesive layer repeatedly removeable and directly attached to the protective cover lens or the touch panel;
   a second transparent low-adhesion adhesive layer repeatedly removeable and directly attached to the display module;
   a first optical transparent sheet stacked between the first transparent low-adhesion adhesive layer and the second transparent low-adhesion adhesive layer, and there is no air gap between the first optical transparent sheet and the first transparent low-adhesion adhesive layer, and between the first optical transparent sheet and the second transparent low-adhesion adhesive layer;
   two optical clear adhesive (OCA) layers each directly attached to one of an upper surface of the first optical transparent sheet and a lower surface of the first optical transparent sheet, wherein there is no air gap between both one of the two OCA layers and the first transparent low-adhesion adhesive layer and the other of the two OCA layers and the second transparent low-adhesion adhesive layer, wherein each of the OCA layers comprises a first structure and a second structure which have same composition ratio and different thicknesses, have different composition ratios but same thickness, or have different treatments;

a second optical transparent sheet interposed between one of the two OCA layers and the first transparent low-adhesion adhesive layer; and a third optical transparent sheet interposed between the other one of the two OCA layers and the second transparent low-adhesion adhesive layer, wherein a full lamination manner is applied between the first transparent low-adhesion adhesive layer and the protective cover lens, between the first transparent low-adhesion adhesive layer and the touch panel, and between the second transparent low-adhesion adhesive layer and the display module.

2. The laminating structure of the OCB of the optical panel in claim 1, wherein materials of the first optical transparent sheet comprise an organic plastic transparent sheet, an inorganic transparent sheet, an organic-inorganic composite sheet, or multilayer stacked hybrid sheets.

3. The laminating structure of the OCB of the optical panel in claim 2, wherein materials of the organic plastic transparent sheet comprise polyethylene terephthalate, cycloolefin polymer, polymethyl methacrylate, polycarbonate, polyimide, polyethylene naphthalate, tri-cellulose acetate, or a combination thereof.

4. The laminating structure of the OCB of the optical panel in claim 2, wherein materials of the inorganic transparent sheet comprise silica glass material, alumina ceramic material, aluminosilicate material, or a combination thereof.

5. The laminating structure of the OCB of the optical panel in claim 1, wherein materials of the first transparent low-adhesion adhesive layer, and the second transparent low-adhesion adhesive layer comprise silicone resin, polyurethane adhesive, acrylic adhesive, ethylene vinyl acetate, copolymer resin, epoxy plastic ester polymer, or a combination thereof.

* * * * *